United States Patent [19]
Roth

[11] Patent Number: 5,051,058
[45] Date of Patent: Sep. 24, 1991

[54] APPARATUS FOR PALLETIZING STACKS OF PAPER SHEETS AND THE LIKE

[76] Inventor: Oskar Roth, Maihölzlistrasse 5, CH-5620 Zufikon, Switzerland

[21] Appl. No.: 403,019

[22] Filed: Sep. 5, 1989

Related U.S. Application Data

[63] Continuation of Ser. No. 56,010, Jun. 1, 1987, abandoned.

[30] Foreign Application Priority Data

Sep. 26, 1986 [CH] Switzerland ............ 3863/86

[51] Int. Cl.⁵ ............................................ B65G 57/22
[52] U.S. Cl. .............................. 414/789.1; 414/676; 414/792.2; 414/794.2; 414/903
[58] Field of Search ............... 414/676, 755, 788.9, 414/789.1, 792, 792.2, 794.2, 903, 924

[56] References Cited

U.S. PATENT DOCUMENTS

| 2,675,928 | 4/1954 | Slater | 414/65 |
| 2,942,717 | 6/1960 | Raynor | 414/792 X |
| 2,960,243 | 11/1960 | Beaulieu | 414/903 X |
| 3,090,503 | 5/1963 | Curtenius | 414/903 X |
| 3,257,015 | 6/1966 | Annable et al. | 414/65 |
| 3,612,300 | 10/1971 | Berghgracht | 414/65 |
| 4,055,256 | 10/1977 | Hagedorn | 414/903 X |
| 4,255,074 | 3/1981 | Meratti et al. | 414/66 X |
| 4,708,564 | 11/1987 | Mylrea et al. | 414/903 X |

FOREIGN PATENT DOCUMENTS 827324 2/1960 United Kingdom ............... 414/792

Primary Examiner—Frank E. Werner
Assistant Examiner—Janice Krizek
Attorney, Agent, or Firm—Peter K. Kontler

[57] ABSTRACT

A palletizing apparatus for stacks of paper sheets has a set of conveyors which deliver a succession of individual stacks or groups of two or more stacks to a palletizing station and onto an air cushion which is defined by two plenum chambers of a table. The palletizing station is equipped with pairs of stops which orient the stacks on the table in the direction of delivery of stacks as well as at right angles to such direction. The plenum chambers are retracted from the palletizing station when the orientation of stacks thereon is completed, and the stack or stacks then descend onto a pallet which is held in a position of readiness on the platform of a raised elevator below the palletizing station. The platform is provided with devices for shifting and/or rotating a pallet thereon to a desired position. The elevator is lowered stepwise to accumulate several layers of stacks and ultimately reaches the level of a receiving conveyor which accepts the loaded pallet. Empty pallets are delivered to the platform by a further conveyor which is located at the level of the receiving conveyor.

22 Claims, 5 Drawing Sheets

APPARATUS FOR PALLETIZING STACKS OF PAPER SHEETS AND THE LIKE

This application is a continuation of application Ser. No. 056,010, filed June 1, 1987, now abandoned.

BACKGROUND OF THE INVENTION

The invention relates to improvements in apparatus for manipulating stacks of paper sheets and the like, and more particularly to improvements in apparatus for accumulating stacks of paper sheets on pallets or like supports.

The dimensions of pallets for transport and temporary storage of stacks of paper sheets are normally standardized. It is desirable and advantageous to orient and distribute the stacks on pallets in such a way that each pallet is or can be loaded to maximum capacity, i.e., that each pallet carries a group of stacks which (if desired) extend all the way and even beyond its marginal portions. This not only involves proper selection of the dimensions of pallets but also an optimum arraying of stacks on each pallet. In most instances, the arraying of stacks on standardized pallets is carried out by hand which is a time-consuming operation. In addition, the accuracy of distribution of stacks on successive pallets depends excessively or exclusively on the skill and carefulness of the person or persons in charge.

OBJECTS AND SUMMARY OF THE INVENTION

An object of the invention is to provide an apparatus which can transfer stacks of overlapping sheets of paper, foil, cardboard or the like onto successive pallets in an optimum distribution, with little loss in time and with any desired degree of automation.

Another object of the invention is to provide an apparatus which can be used to accumulate stacks in one or more layers and wherein the stacks which are to be deposited on successive pallets can be grouped in any one of a number of different ways.

A further object of the invention is to provide the apparatus with novel and improved means for orienting stacks prior to their transfer onto pallets and with novel and improved means for orienting pallets prior to transfer of stacks onto them.

An additional object of the invention is to provide the apparatus with novel and improved means for transporting stacks to the palletizing station and with novel and improved means for delivering pallets to optimum positions for reception of individual stacks or groups of stacks.

Still another object of the invention is to provide the apparatus with novel and improved means for manipulating empty and loaded pallets.

A further object of the invention is to provide a novel and improved method of converting a series of successive stacks into arrays of stacks on a succession of standardized pallets.

Another object of the invention is to provide the apparatus with novel and improved means for converting it for accumulation of different numbers of differently dimensioned stacks on differently dimensioned pallets with little loss in time and in such a way that each pallet is invariably loaded or can be loaded to capacity.

The invention is embodied in an apparatus for palletizing stacks of paper sheets and the like. The apparatus comprises a table which defines a substantially horizontal air cushion above its upper side and comprises at least one plenum chamber which is movable to and from a predetermined position at a palletizing station, means for transporting stacks to the table, means for orientating stacks on the table, an elevator which is disposed below the table and is movable between a raised and a lowered position, means for supplying empty pallets to the elevator when the latter is held in its lowered position, and means for moving the plenum chamber to and from the predetermined position at such intervals that the plenum chamber is moved to the predetermined position preparatory to reception of one or more stacks from the transporting means and is moved from the predetermined position upon completed orientation of the stack or stacks thereon and while the elevator with a pallet thereon is held in the raised position so that the oriented stack or stacks descend onto the pallet on the elevator.

The transporting means preferably comprises a first conveyor which serves to advance toward the palletizing station a single file of stacks, and a second conveyor which serves to independently transport preselected numbers of stacks (one or more) from the file on the first conveyor onto the table at the palletizing station. The table preferably comprises two plenum chambers which are mirror symmetrical to each other with reference to a plane extending at right angles to the plane of the table, and the moving means preferably comprises means for jointly moving the plenum chambers toward each other to the predetermined positions in which the plenum chambers jointly support one or more stacks at the palletizing station, and from the predetermined positions so as to enable the stack or stacks to descend onto the pallet which is supported by the elevator. The pallet can receive a single pile of two or more superimposed stacks or one or more layers of stacks. The conveyors define an elongated path for advancement of stacks to the palletizing station, and the orienting means preferably comprises means for positioning the stacks at the palletizing station in the longitudinal direction as well as transversely of the path.

The elevator preferably comprises means for shifting a pallet thereon in a plurality of directions in substantial parallelism with the plane of the table and for rotating such pallet about an axis which is normal to the table.

The first conveyor can include a gathering conveyor which accumulates a file or row of abutting stacks, and the second conveyor can include guide means for the stacks. Such guide means defines a vertical surface along which the stacks slide on their way to the palletizing station so as to ensure that each stack enters the station in a predetermined position with reference to the aforementioned symmetry plane and with reference to the aforementioned axis.

The orienting means can comprise two stops which flank the stack or stacks at the palletizing station, and means for moving at least one of the stops toward and away from the other stop. The conveyors of the transporting means advance the stacks in a predetermined direction along the predetermined path, and a first stop of the orienting means is preferably movable into the path between the transporting means and the palletizing station. A second stop is located downstream of the first stop (as seen in the stack feed direction) so that the stack or stacks at the palletizing station are located between the first and second stops, and the orienting means further comprises the aforementioned means for moving at least one of the stops toward the other stop. Such orienting means preferably further comprises means for pivoting the first stop with reference to the path between a first position in which the first stop extends across the path behind the stack or stacks at the palletizing station, and a second position in which the first stop is located above the path and permits entry of stacks into the palletizing station, i.e., onto the air cushion or cushions defined by the plenum chamber or chambers of the table.

The plenum chambers have first marginal portions which are adjacent each other when they assume their predetermined positions, and second elongated marginal portions which are inclined with reference to the first marginal portions (e.g., at angles of 90 degrees). The marginal portions have upper sides which are provided with orifices to discharge air currents which form the air cushion. The orifices can form rows, and the mutual spacing of orifices in such rows preferably equals or approximates 60 mm. Each plenum chamber can be provided with additional air discharging orifices forming a row which is substantially parallel to the respective first marginal portion.

The means for jointly moving the plenum chambers away from each other is preferably designed to move such chambers at a plurality of different speeds depending upon the nature of sheets, the dimensions of sheets, the height of stacks and/or the number of stacks on the table. Each plenum chamber preferably comprises means for maintaining the pressure of air in the air cushion between approximately 4 and 16 millibar, most preferably at a pressure in the range of 10 millibar.

The elevator includes a platform for pallets, means for turning the platform through angles of at least 90 degrees about an axis which is normal to the plane of the table, and means for shifting a pallet on the platform with reference to the axis and for holding the pallet on the platform in a selected position. Such apparatus further comprises means for receiving loaded pallets from the platform in the lowered position of the elevator, and the elevator comprises means for conveying empty pallets from the pallet supplying means onto the platform and for conveying loaded pallets from the platform onto the receiving means. Such conveying means can comprise one or more chain conveyors.

The apparatus can further comprise aligning means which is disposed beneath the table and serves to align stacks on the elevator upon completed transfer of a single stack or a layer of two or more stacks onto a pallet on the platform of the elevator. The arrangement is or can be such that the aligning means registers with the stack or stacks on the pallet when the elevator completes a stepwise movement from its raised position or upon completion of each stepwise movement of the elevator in a direction from its raised or topmost position. The aligning means can comprise two substantially mirror symmetrical aligning members which are disposed at opposite sides of a pallet on the platform of the elevator, and means for jointly moving the aligning members toward and away from each other, preferably through identical distances. The aligning members can correct the orientation of stacks on a pallet, for example, if the pallet is flexed under the weight of the stack or stacks thereon and/or for other reasons.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
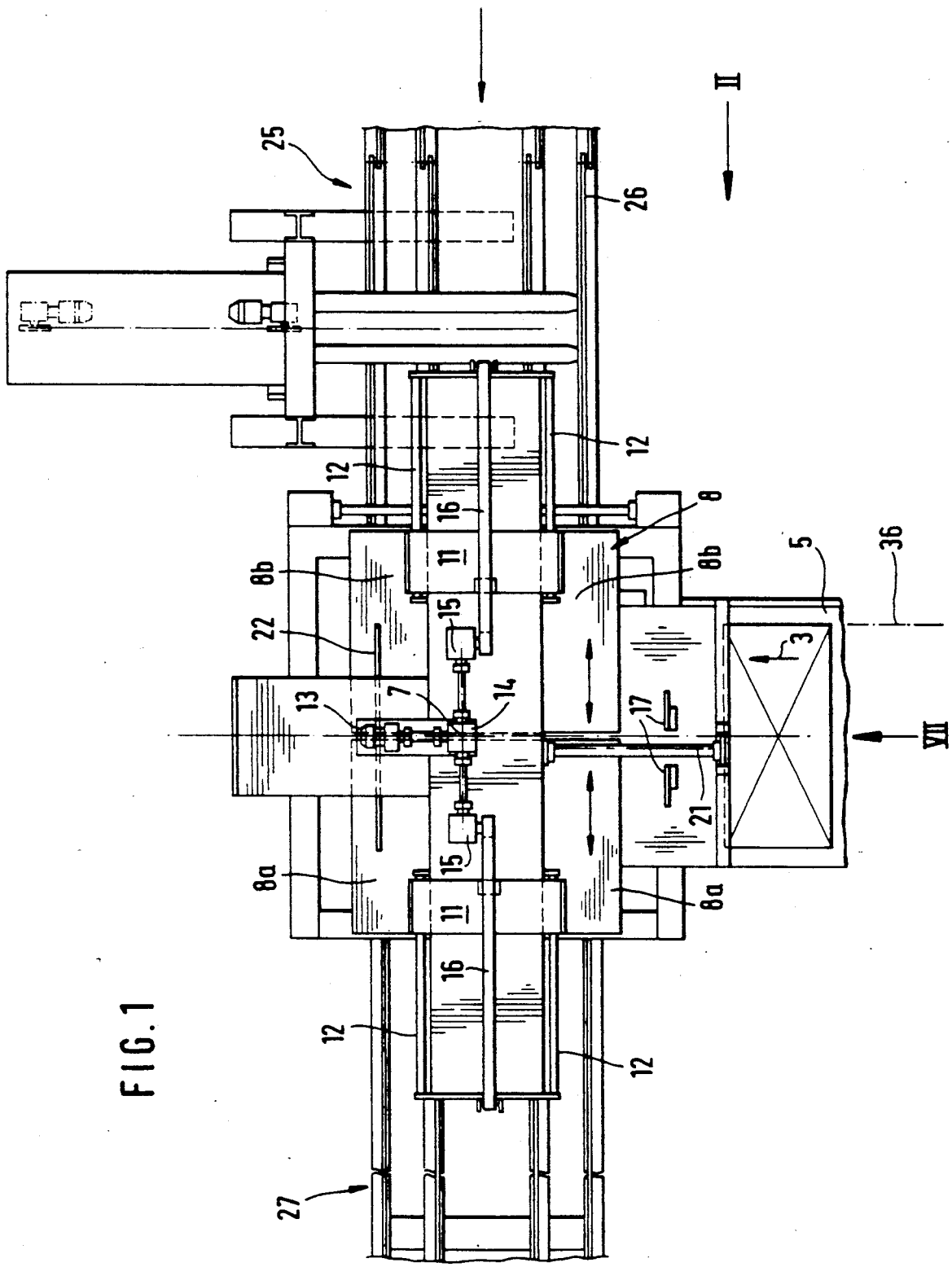
FIG. 1 is a plan view of an apparatus which embodies one form of the invention.
Figure 2:
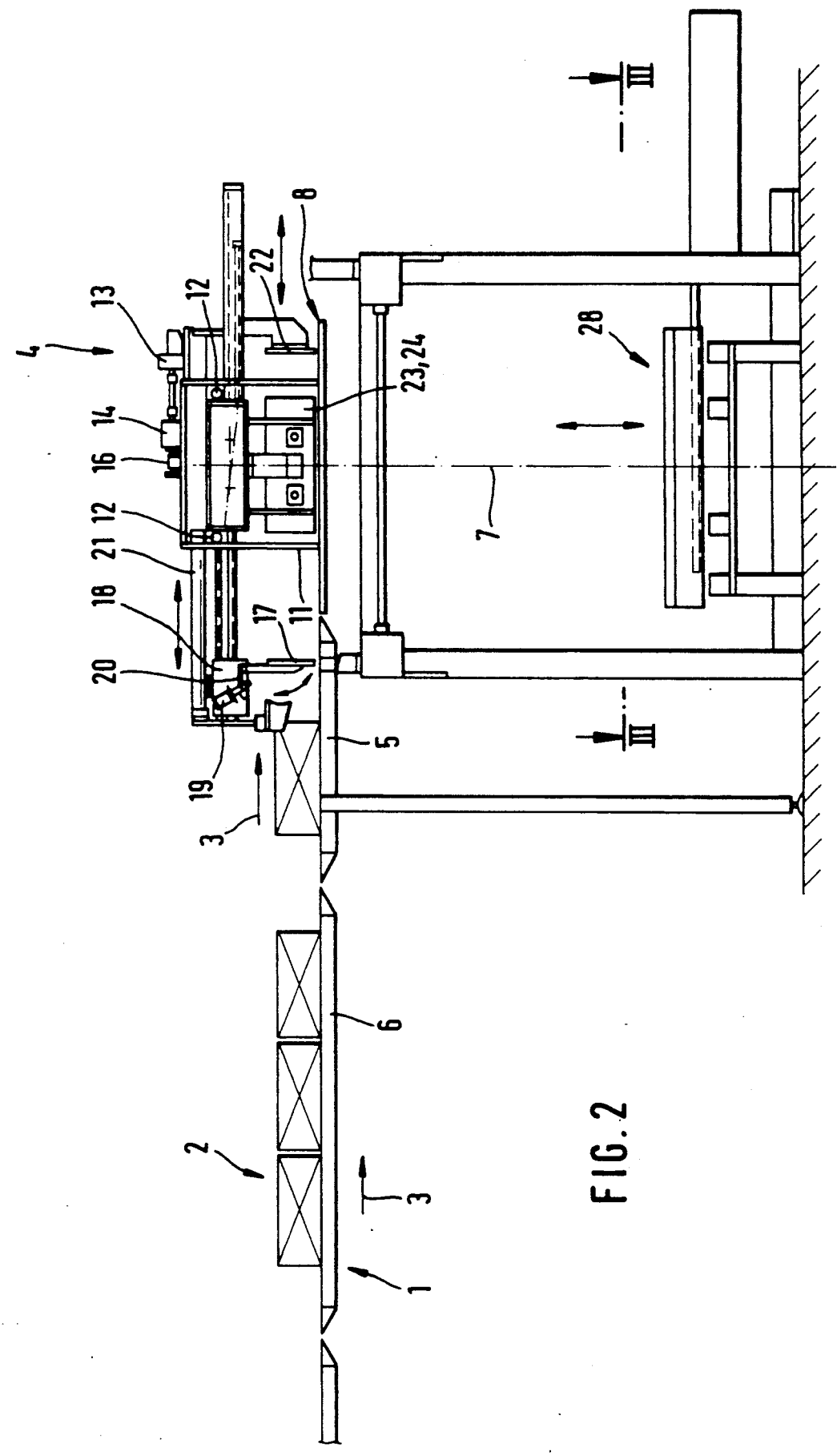
FIG. 2 is a side elevational view as seen in the direction of arrow II in FIG. 1.
Figure 4:
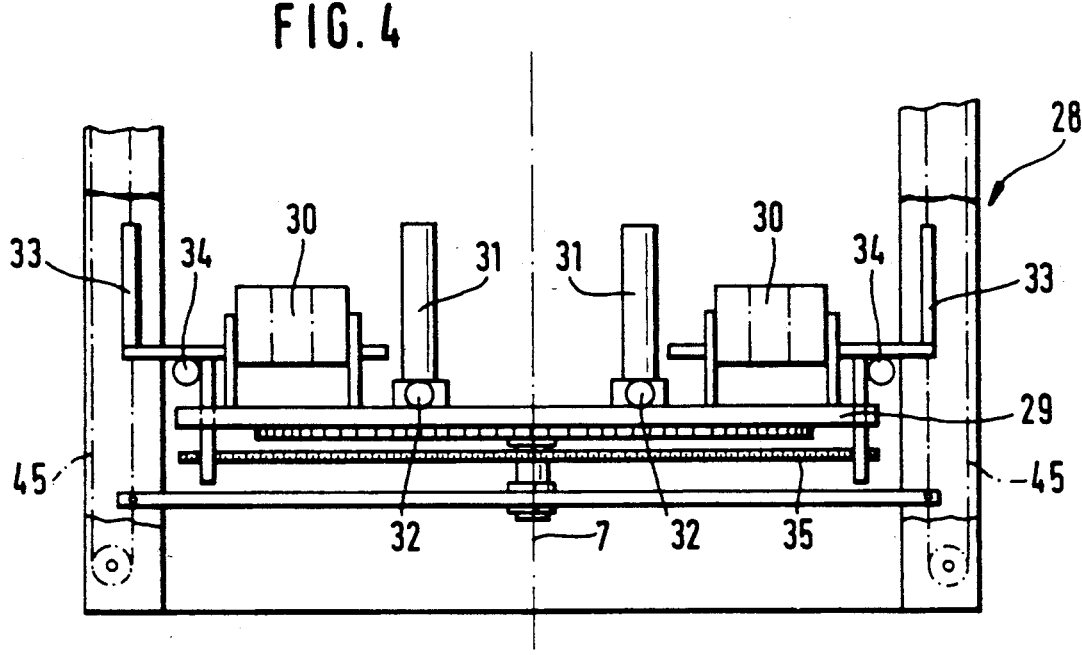
FIG. 4 is an end elevational view as seen in the direction of arrow IV in FIG. 3.
Figure 3:
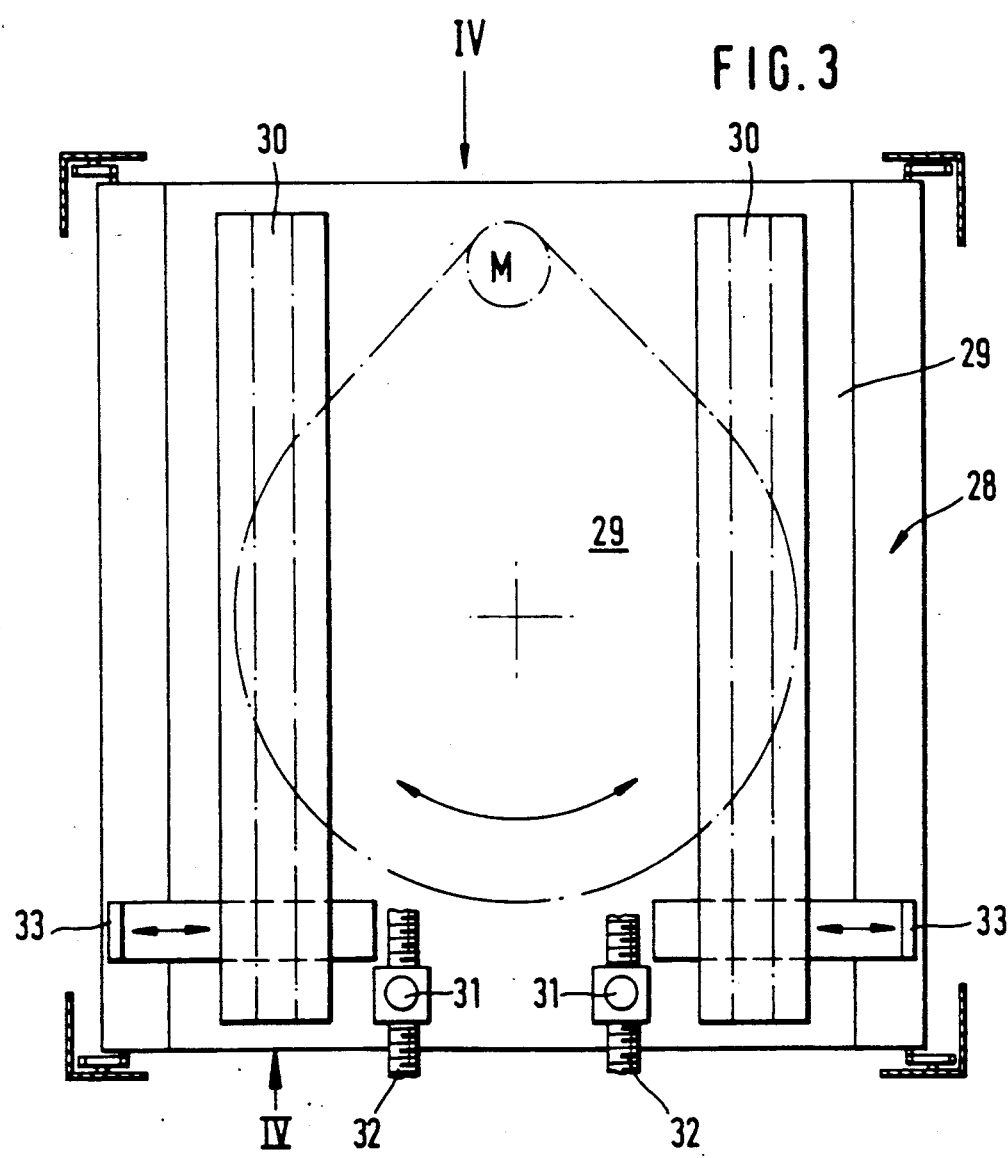
FIG. 3 is a horizontal sectional view as seen in the direction of arrows from the line III—III in FIG. 2.

Referring to FIGS. 1 and 2, the apparatus comprises a transporting unit 1 which advances a series of stacks 2 of overlapping paper sheets along a horizontal path in the direction of arrow 3 on to a palletizing station 4. The stacks 2 are formed by a cross cutter (not shown). The transporting unit 1 comprises a first conveyor 6 which is a gathering conveyor in that it accumulates successively delivered stacks 2 into a row or file of abutting stacks, and the transporting unit 1 further comprises a second conveyor 5 which can be said to constitute a singularizing conveyor in that it advances individual stacks 2 or sets or groups of two or more successive stacks from the conveyor 6 into the palletizing station 4. At least the singularizing conveyor 5 comprises a guide member 36 (indicated in FIG. 1 by a phantom line) which defines a vertical surface along which one lateral side of each stack 2 slides on its way toward the palletizing station 4; this ensures that each such lateral side reaches the station 4 in a predetermined position with reference to a vertical axis 7 which extends at right angles to the plane of a two-piece horizontal table 8 defining above its upper side an air cushion on which the stack or stacks 2 at the palletizing station 4 float to facilitate their manipulation, namely orientation in and transversely of the direction which is indicated by the arrow 3. The singularizing conveyor 5 is driven independently of the other conveyor or conveyors of the transporting unit 1 so that it can deliver to the palletizing station individual stacks or groups of two or more stacks 2 whenever the table 8 is ready to receive one or more fresh stacks, namely upon completed orientation of previously delivered stack(s) and upon completed transfer of the oriented stack or stacks onto an empty pallet or onto one stack or two more superimposed stacks or one layer or two or more superimposed layers of stacks on a partially loaded pallet.

The gathering conveyor 6 can receive two or more stacks 2 from the cross cutter in a direction at right angles to the plane of FIG. 2 and delivers successive stacks to the singularizing conveyor 5. The conveyor 6 is or can be provided with its own drive to ensure that it can advance stacks 2 toward the conveyor 5 whenever necessary to guarantee that the palletizing station 4 invariably contains one or more stacks when the table 8 is ready for reception of stacks from the conveyor 5. The arrangement is preferably such that, if the conveyor 5 is to deliver two or more stacks 2 at a time, the stacks which are to enter the station 4 are disposed one behind the other (as seen in the direction of arrow 3). As mentioned above, such stacks slide along the vertical surface of the guide member 36 to ensure that those surfaces of the stacks which have been caused to advance along the guide member are invariably located at a predetermined distance from the axis 7. This axis can be said to constitute the central vertical axis of the palletizing station 4.

In the apparatus which is shown in FIGS. 1 to 7, the table 8 comprises two sections 8a and 8b each of which can be said to constitute a plenum chamber and each of which can define one-half of the air cushion for supporting the stack or stacks 2 from below so that friction between the stack or stacks at the station 4 and the table is minimal or zero. The sections or plenum chambers 8a, 8b are mirror symmetrical to each other with reference to a vertical plane which includes the axis 7 and is parallel to the vertical surface of the guide member 36. Each of the plenum chambers 8a, 8b is basically a hollow plate provided with suitably distributed orifices which discharge small currents of air forming the air cushion at the upper side of the table 8. The manner in which the internal compartments (one shown in FIG. 6) of the plenum chambers 8a, 8b are connected or connectable to a suitable source of pressurized gaseous fluid (normally air) and the manner in which the pressure of air in these compartments can be regulated to ensure the establishment of a predetermined pressure above the upper side of the table 8 is well known in the art and need not be described here.

Figure 5:
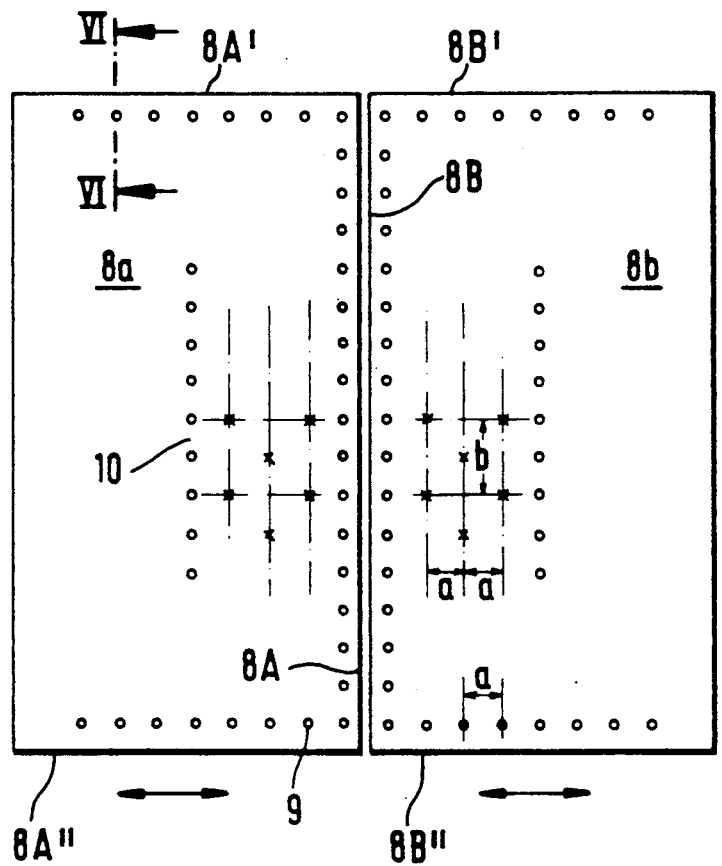
FIG. 5 is a plan view of the table.
Figure 6:
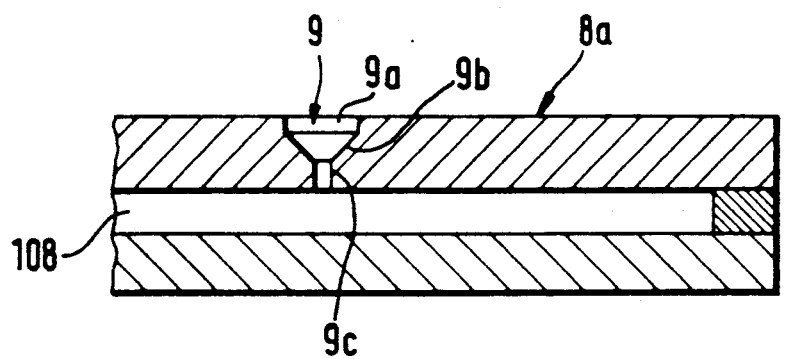
FIG. 6 is an enlarged fragmentary vertical sectional view as seen in the direction of arrows from the line VI—VI of FIG. 5.

FIG. 5 shows one presently preferred distribution of orifices in the upper sides of the plenum chambers 8a and 8b. These plenum chambers have parallel marginal portions 8A, 8B which are provided with rows of equidistant orifices 9, and each plenum chamber is further formed with two rows of orifices along those marginal portions 8A', 8A" and 8B', 8B" which extend at right angles to the symmetry plane between the two plenum chambers. The distance a between the centers of orifices 9 is preferably 60 mm. Each of the two plenum chambers 8a, 8b is preferably further provided with at least one additional row of orifices 10 which are parallel to the symmetry plane between the two plenum chambers. FIG. 6 shows that each of the orifices 9 can comprise a cylindrical portion 9a at the upper side of the respective plenum chamber 8a or 8b, a frustoconical portion 9b adjacent to the cylindrical portion 9a, and a small-diameter cylindrical portion 9c which communicates with the frustoconical portion 9b and with the respective internal compartment 108. The configuration of the orifices 10 can match that of the orifices 9. The maximum diameter of each frustoconical portion 9b is or can be about 10 mm, and the diameter of the small-diameter cylindrical portion 9c is or can be about 1.5 mm. Additional rows of orifices (denoted at x in FIG. 5) are provided between the rows of orifices 10 and the rows of orifices 9 along the marginal portions 8A, 8B, and each such additional orifice can contain a spherical valving element*(not specifically shown) which is depressed by the lowermost sheet of a stack 2 on the table 8 to permit escape of compressed air beneath the stack. The distance b between the orifices which contain spherical valving elements can equal or approximate 2a (i.e., approximately 120 mm). The pressure of compressed air in the compartments 108 of the plenum chambers 8a, 8b and the throttling action of the valving elements are preferably selected in such a way that the pressure of air in the cushion above the table 8 is normally between 5 and 15 millibar (i.e., not less than 4 and not more than 16 millibar) and preferably equals or approximates 10 millibar. The pressure of air in the compartments 108 of the plenum chambers 8a and 8b can be regulated by one or more pressure regulating valves which are installed in the conduit or conduits connecting such compartments with the source of compressed air (e.g., a blower or a pump). Alternatively, the pressure can be regulated by adjusting the pump which delivers compressed gaseous fluid.

* Available by Gerhard Busch, Graphische Maschinen, D-2105 Seevetal (BRD).

Figure 7:
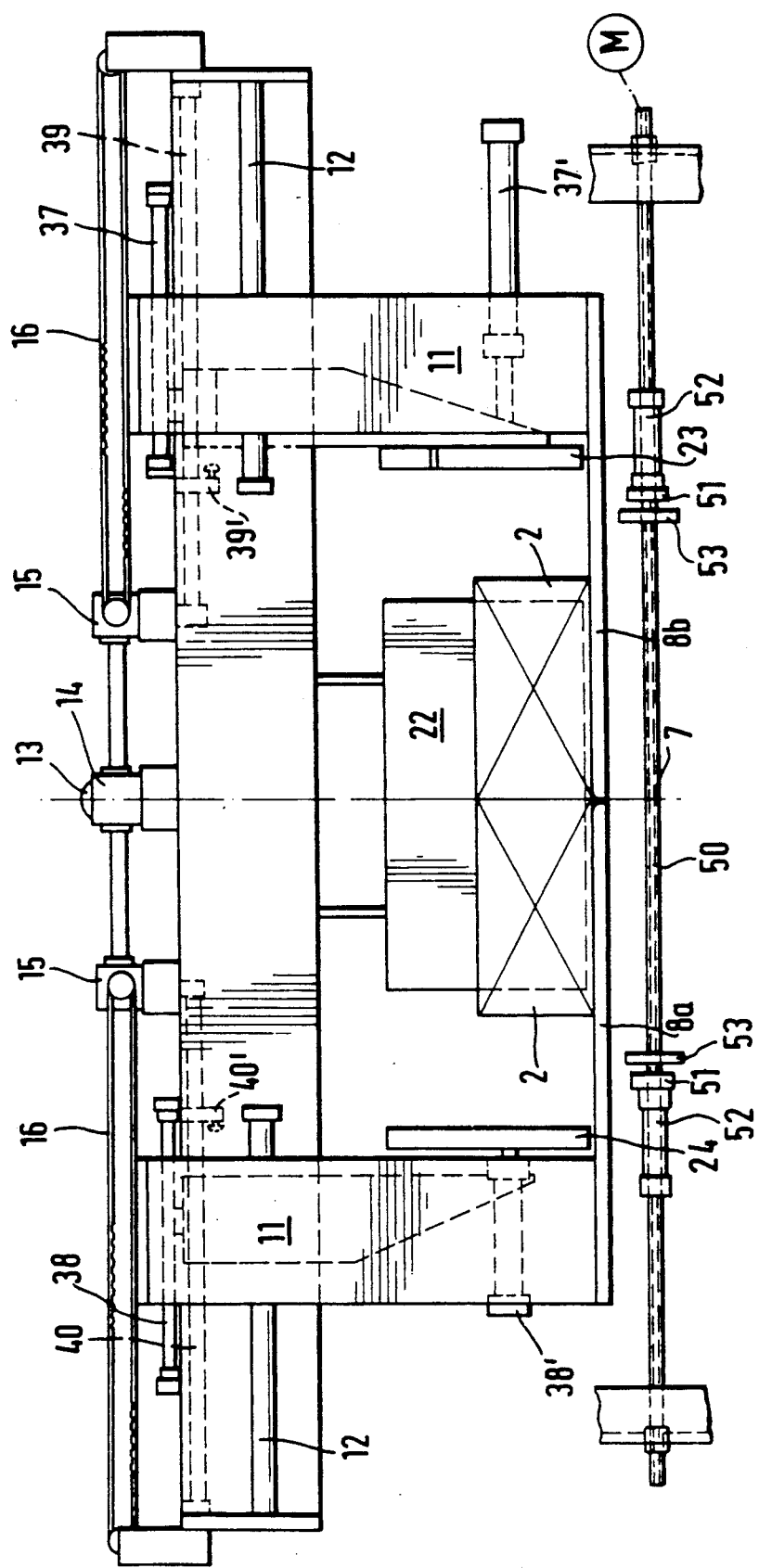
FIG. 7 is a view as seen in the direction of arrow VII in FIG. 1.

The means for moving the plenum chambers 8a, 8b toward and away from each other through identical increments comprises yokes 11 which are slidable along pairs of parallel tie rods 12 (FIGS. 1, 2 and 7). The means for synchronizing the movements of the plenum chambers 8a, 8b in directions toward or away from each other comprises a motor 13 which transmits motion to two toothed belt conveyors 16 through the intermediary of a first bevel gear transmission 14 and two additional bevel gear transmissions 15. The conveyors 16 are coupled to the respective yokes 11. The motor 13 is preferably a variable-speed motor so that it can move the plenum chambers 8a, 8b away from each other at any one of several different speeds depending upon the quality of sheets which form the stacks 2, the dimensions of the sheets, the number of sheets per stack and the number of stacks at the palletizing station 4. By maintaining the pressure in the air cushion above the table 8 at approximately 10 millibar and by moving the plenum chambers 8a, 8b away from each other at a proper speed, these plenum chambers can be moved from their operative positions (shown in FIG. 1) at the palletizing station 4 to the retracted positions in which the stack or stacks can descend by gravity onto a pallet below them without any shifting of the lowermost sheet or sheets of the stack or stacks relative to the sheets above them.

The means for orienting the stack or stacks 2 at the palletizing station 4 comprises a first pair of stops 17, 22 (FIGS. 1 and 2) and a second pair of stops 23, 24 (FIG. 7). The stop 17 is a two-piece flap which is movable into the path of oncoming stacks 2 between the conveyor 5 and the palletizing station 4, and the stop 22 is located downstream of the stop 17, as seen in the direction of arrow 3. Thus, the stack or stacks 2 at the station 4 are located between the stops 17 and 22, and at least one of these stops is movable toward and away from the other stop to thereby shift the stack or stacks in or counter to the direction which is indicated by the arrow 3. The stop 17 is movable (pivotable) between an operative position in which it extends into the path of movement of stacks 2 into the station 4 and across such path (such position of the stop 17 is shown in FIG. 2), and a second or inoperative position above the path to thus permit entry of one or more stacks into the station 4, i.e., onto the air cushion above the plenum chambers 8a, 8b which are then maintained in the positions shown in FIG. 1, i.e., with the marginal portions 8A, 8B immediately adjacent each other. The means for pivotably mounting the stop 17 includes a support 18 (omitted in FIG. 1 for the sake of clarity), and the means for pivoting the stop 17 includes a double-acting hydraulic or pneumatic cylinder and piston unit 19 which can reciprocate a toothed rack 20 mating with a pinion on the stop 17. When a selected number of stacks 2 (e.g., one or two stacks) has entered the station 4, the unit 19 is actuated to pivot the stop 17 from the inoperative position to the operative position of FIG. 2 behind the stack or stacks on the table 8. A motor 21 (e.g., a double-acting piston rodless bar hydraulic or pneumatic cylinder)* is thereupon started to move the support 18 for the stop 17 toward the stop 22 and to thereby change the position of the stack or stacks 2 relative to the table 8. The stop 22 is movable toward the stop 17 counter to the direction which is indicated by the arrow 3 so as to ensure that the stack or stacks are properly oriented in the longitudinal direction of the path of movement of stacks 2 with and beyond the conveyor 5. The means for moving the stop 22 comprises a further motor which can but need not be identical with the motor 21 for the carrier 18 (i.e., for the stop 17). The stops 17, 22 cooperate to move the stack or stacks 2 at the station 4 to a proper position or positions in the direction of the abscissa of a coordinate system whose ordinate extends at right angles to the direction which is indicated by the arrow 3.
* Available by ORIGA International AB, S-73200 Arboga.

The means for orienting the stack or stacks 2 on the table 8 in the direction of such ordinate includes the stops 23, 24 which are movable toward and away from each other by means analogous to the means for moving the stops 17, 22 and including double-acting piston rodless pneumatic or hydraulic motors 37, 38 and pneumatic cylinders 37', 38' (shown in FIG. 7). The planes of the stops 23, 24 are parallel to each other and extend at right angles to the plane of the stop 22.

The stops 17, 22 and 23, 24 can be manipulated to properly orient one, two or more (e.g., four) stacks 2 with reference to the table 8 so that the properly oriented stack or stacks assume predetermined positions with reference to the axis 7. FIG. 7 shows feed screws 39 and 40 with longitudinally displaceable hydraulic shock absorbers 39', 40' which respectively serve to select the starting positions of the stops 23, 24 with reference to the stack or stacks 2 on the table 8. Similar or analogous adjusting means are provided for the stops 17 and 22 to enhance the versatility of the apparatus and of its orienting means. The nuts which are provided on or are connected to the stops 23, 24 and mate with the feed screws 39, 40 are not specifically shown in the drawing. The adjustment is made in dependency on the format of the stacks 2 as well as on the number of stacks which are to be oriented prior to their transfer onto a pallet below the station 4. Means can be provided for automatically adjusting the starting positions of the stops 17, 22 and 23, 24 as well as for adjusting the extent of movability of these stops toward and away from each other as a function of the format and number of stacks on the table 8. Such adjusting means can include one or more incremental drives, e.g., step motors which are controlled by one or more microprocessors or in another suitable way not forming part of the invention.

The plenum chambers 8a and 8b are disposed immediately above an aligning device including two feed screws 50 which are driven by a motor M and are rotatably mounted in the frame of the apparatus in the regions of the sides of the plenum chambers. The threads of the feed screws 50 are inclined in opposite directions and extend away from the axis 7 (see FIG. 7). The purpose of the feed screws 50 is to shift two carriers 51 toward or away from each other, depending on the direction of rotation of the feed screws. The extent of movability of one of the carriers 51 is the same as that of the other carrier, except that they must move in opposite directions. Each of the carriers 51 supports a pneumatic cylinder and piston unit 52, and the piston rods of these units carry plate-like aligning members or abutments 53 which are movable toward or away from the axis 7 in response to actuation of the respective units 52.

A pallet which is to receive one or more stacks 2 in response to movement of plenum chambers 8a, 8b away from each other is supported on the platform 29 of an elevator 28 which is installed below the palletizing station 4 and is movable between a raised position and a lowered position (shown in FIG. 2). When in the lowered position, the platform 29 of the elevator 28 is located between two sections of a cross conveyor system 25 including a first conveyor 26 which supplies empty pallets to the platform 29 and a second conveyor 27 which receives loaded pallets from the platform 29. An empty pallet which has been transferred onto the platform 29 is lifted by the elevator 28 to a level immediately below the table 8 at the station 4 so that the stack or stacks 2 on the air cushion can be transferred onto the empty pallet in immediate response to retraction of the plenum chambers 8a and 8b from the operative positions which are shown in FIG. 1. The platform 29 supports two endless chain conveyors 30 which serve as a means for transferring empty pallets onto the platform 29 while the elevator 28 is kept in the lowered position and for transferring loaded pallets from the platform 29 onto the receiving conveyor 27, again while the elevator 28 is held in the lowered position. The level of the conveyor 26 may but need not be the same as that of the conveyor 27, and the elevator 28 is movable to at least one intermediate position, depending on the number of stacks or layers of stacks which are to be accumulated on a pallet before the latter is transferred onto the conveyor 27. The chain conveyors 30 can be said to constitute a bridge between the conveyors 26 and 27 in the lowered position of the elevator 28 and its platform 29.

The platform 29 supports abutments or stops 31 which can be used to shift a pallet so as to change its orientation with reference to the elevator 28 in order to ensure that the pallet can be properly loaded with stacks. The stops 31 are disposed between the chains 30 close to their discharge ends and are movable relative to the platform 29 by adjusting means in the form of feed screws 32 in parallelism with the chain conveyors. In addition, the stops 31 are preferably movable into and away from the path of an oncoming pallet (the means for effecting such movements, e.g., pivotal movements, of the stops 31 is not specifically shown in the drawing).

A pallet which is delivered to the platform 29 by the conveyor 26 is engaged by the chains 30 and is advanced against the stops 31. The conveyors 30 have clamping jaws 33 which can engage an oncoming pallet to ensure that such pallet shares the movements of the conveyors 30 toward the stops 31. The clamping jaws 33 are positioned to engage the respective sides of an oncoming pallet. The pallets which are supplied by the conveyor 26 are or can be standard pallets which are available for transport of stacked sheets and for similar purposes. Such pallets may be mounted on rollers or wheels and come in different sizes, depending on the number of stacks to be supported thereby.

The jaws 33 are actuated by fluid-operated motors 34 which are mounted on a motor-driven feed screw 35 so that they can be moved toward and away from each other. In this manner, the jaws 33 can be moved against the respective sides of a pallet in the range of the chain conveyors 30 on the platform 29. The feed screw 35 is rotatably mounted on the platform 29 and is rotatable by a suitable motor. The platform 29 is rotatable by a motor M, at least through an angle of 90 degrees, about the axis 7 so as to allow for additional changes in orientation of a pallet on the elevator 28 with reference to the table 8 and the station 4. Thus, the pallet can be moved into abutment with the stops 31 (whose positions are adjustable by the feed screws 32), and the pallet is further shiftable in the direction of the feed screw 35 as well as turnable about the axis 7. Such nearly universal adjustability of a pallet on the elevator 28 renders it possible (in conjunction with the orienting means 17, 22, 23 and 24 for the stack or stacks 2 on the table 8) to load each pallet to capacity or in another desired manner prior to transfer from the platform 29 onto the receiving conveyor 27. The feature that the platform 29 is rotatable about the axis 7 is desirable and advantageous because this renders it possible to move a rectangular pallet on the platform 29 to a position in which the longer sides of the pallet extend in parallelism with the planes of the stops 23, 24 or at right angles to such planes. The platform 29 is movable up and down by chain conveyors 45.

The operation is as follows:

The elevator 28 lifts an empty pallet on the platform 29 to the raised position beneath the table 8 whose plenum chambers 8a, 8b are then immediately adjacent each other. The pallet is properly oriented with reference to the stack or stacks 2 of sheets on the table 8 as a result of shifting (if necessary) in the longitudinal direction of the feed screws 32, in the longitudinal direction of the feed screw 35 and/or about the axis 7. The stack or stacks 2 on the table 8 are properly oriented by the stops 17, 22 and 23, 24. The motor 13 is started to move the plenum chambers 8a, 8b apart so that the stack or stacks 2 descend onto the empty pallet on the platform 29. The inertia of the stack or stacks 2 above the air cushion is such that the plenum chambers 8a and 8b can be retracted without any shifting of the lowermost sheet or sheets of the stack or stacks which are then free to descend onto the empty pallet. The elevator 28 is thereupon lowered to the level of the receiving conveyor 27 or to an intermediate level, depending upon the number of stacks or layers of stacks which are to be accumulated on the pallet before the latter is removed from the platform 29 in response to starting of motor means for the chain conveyors 30. The plenum chambers 8a, 8b are returned to the positions of FIG. 1 as soon as the lowering of the elevator 28 by a step or all the way to the level of the receiving conveyor 27 is completed, and the station 4 is then ready to receive one or more stacks 2 for orientation (if necessary) prior to deposition on an empty pallet or on top of the stack or stacks of a partially loaded pallet. The same procedure is repeated as often as necessary to fully load a pallet on the platform 29 or to transfer single stacks or single layers of stacks onto successive empty pallets.

When the platform 29 has been lowered by a step, the topmost stack 2 or the topmost layer of stacks (or the only stack or the only layer of stacks) on the platform 29 is located between the plate-like abutments 53. The cylinders 52 are then actuated to move the abutments 53 into engagement with the stack or stacks between them so as to ensure an optimum orientation of the stack or stacks on the pallet which occupies the platform 29 with reference to the axis 7 even if the pallet happens to bend or flex under the weight of one or more stacks thereon and/or if the thickness of sheets of which the stacks 2 are assembled is not uniform. Thus, the aligning device including the parts 50 to 53 ensures that the pallet on the platform 29 invariably carries a properly oriented single stack, a single layer of properly oriented stacks, or two or more superimposed layers of properly oriented stacks. For example, the stacks of each upper layer can overlie exactly the stacks of the layer therebelow.

The provision of means for adjusting a pallet relative to the elevator 28 (with and relative to the platform 29) and the provision of means for orienting the stack or stacks on the table 8 renders it possible to load each pallet in a highly predictable manner as well as to load each pallet to capacity without risking any shifting of stacks relative to each other. The guide member 36 also contributes to predictable and optimum deposition of stacks on the pallets because such guide member ensures that the stacks reach the table 8 in predetermined positions with reference to the axis 7 and in proper positions for manipulation by the stops 17, 22 and 23, 24. The platform 29 may but need not be turned through 90 degrees when it descends to the level of the receiving conveyor 27; this depends on the desired orientation of pallets which are transported by the conveyor 27 to storage or to a treating station, not shown, e.g., to a packing machine. The chain conveyors 30 serve to transfer empty pallets from the supply conveyor 26 onto the platform 29 as well as to transfer loaded pallets from the platform 29 onto the receiving conveyor 27. The delivery of an empty pallet onto the platform 29 can take place simultaneously with transfer of a loaded pallet onto the conveyor 27.

The improved apparatus can be automated to any desired extent. It can be provided with customary monitoring means which transmit signals to the transporting unit 1, to the conveyor system 25, to the motor for the elevator 28, to the motors for the orienting means 17, 22, 23, 24, to the means 13 for moving the plenum chambers 8a, 8b toward and away from each other, to the means for adjusting the orienting means at the station 4, and to the means for changing the position of a pallet on the platform 29 and/or the position of the platform relative to the elevator 28.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for palletizing stacks of sheets, comprising a table providing a substantially horizontal air cushion and having two plenum chambers which are mirror symmetrical to each other with reference to a plane extending at right angles to the table and which are movable to and from predetermined positions in which the chambers jointly support one or more stacks; means for transporting stacks to said table along a longitudinal feed path, said transporting means including a first conveyor arranged to advance toward said table a single file of stacks and a second conveyor arranged to independently transport preselected numbers of stacks from the file on the first conveyor onto the table; means including pairs of longitudinal and transverse opposing movable stops, each stop selectively actuated toward and away from the opposite stop, for orienting stacks on said table; an elevator for pallets below said table, said elevator comprising means for shifting a pallet thereon in a plurality of directions in substantial parallelism with said table; means for moving said elevator between raised and lowered positions; and means for jointly moving said chambers to and from said predetermined positions at such intervals that the chambers are moved to said predetermined positions preparatory to reception of one or more stacks from said transporting means and are moved from said predetermined positions upon completed orientation of the stack or stacks thereon and while the elevator with a pallet thereon is maintained in said raised position so that the oriented stack or stacks descend onto the pallet.

2. The apparatus of claim 1, wherein said first conveyor includes a gathering conveyor arranged to accumulate a file of abutting stacks.

3. The apparatus of claim 1, wherein said second conveyor includes guide means for the stacks, said guide means defining a vertical surface along which the stacks slide.

4. The apparatus of claim 1, wherein said orienting means comprises two stops which flank the stack or stacks, and means for moving said stops toward and away from each other.

5. The apparatus of claim 1, wherein said orienting means comprises a first stop movable into said path between said transporting means and said table, a second stop located downstream of said first stop so that the stack or stacks at said table are located between said stops, and means for moving at least one of said stops toward and away from the other of said stops.

6. The apparatus of claim 5, wherein said orienting means further comprises means for pivoting said first stop with reference to said path between a position in which the first stop extends across said path and a position in which the first stop is located above said path and permits movement of stacks to said table.

7. The apparatus of claim 1, wherein said chambers have first elongated marginal portions which are adjacent each other in said predetermined positions and second elongated marginal portions inclined with reference to said first marginal portions, said first and second marginal portions having upper sides provided with orifices for air currents which form said cushion.

8. The apparatus of claim 7, wherein said orifices form rows and the mutual spacing of orifices in said rows equals or approximates 60 mm.

9. The apparatus of claim 7, wherein each of said chambers has additional orifices forming a row which is substantially parallel to the respective first marginal portion.

10. The apparatus of claim 1, wherein said means for jointly moving said chambers includes means for moving the chambers away from each other at a plurality of different speeds.

11. Apparatus for palletizing stacks of sheets, comprising a table providing a substantially horizontal air cushion and having at least one plenum chamber therein movable to and from a predetermined position; means for transporting stacks to said table along a longitudinal feed path; means including pairs of longitudinal and transverse opposing movable stops, each stop selectively actuated toward and away from the opposite stop, for orienting stacks on said table; an elevator for pallets below said table, said elevator comprising means for rotating the pallet thereon about an axis which is normal to said table; means for moving said elevator between raised and lowered positions; and means for moving said chamber to and from said predetermined position at such intervals that the chamber is moved to said predetermined position preparatory to reception of one or more stacks from said transporting means and is moved from said predetermined position upon completed orientation of the stack or stacks thereon and while the elevator with a pallet thereon is maintained in said raised position so that the oriented stack or stacks descend onto the pallet.

12. The apparatus of claim 11, comprising means for supplying empty pallets to the elevator in said lowered position thereof.

13. The apparatus of claim 11, further comprising means for aligning the stacks on the pallet which is supported by said elevator.

14. The apparatus of claim 13, wherein said chamber includes means for maintaining the pressure of air in said cushion between approximately 4 and 16 millibar.

15. The apparatus of claim 14, wherein said maintaining means is designed to maintain the pressure of air in said cushion at approximately 10 millibar.

16. The apparatus of claim 13, wherein said aligning means is located at a level below said table and a stack on the pallet which is carried by said elevator is in register with said aligning means after lowering of the elevator from said raised position.

17. The apparatus of claim 13, wherein said aligning means comprises two substantially mirror symmetrical aligning members disposed at opposite sides of the pallet on said elevator and means for moving said aligning members toward or away from each other.

18. The apparatus of claim 13, said plenum chamber being movable to and from said predetermined position along a predetermined direction; and wherein said aligning means is arranged to align the stacks on the pallet along said predetermined direction.

19. The apparatus of claim 18, wherein said aligning means includes at least one aligning member movable along said predetermined direction and an additional aligning member arranged to cooperate with said one aligning member.

20. Apparatus for palletizing stacks of sheets, comprising a table providing a substantially horizontal air cushion and having at least one plenum chamber therein movable to and from a predetermined position; means for transporting stacks to said table along a longitudinal feed path; means including pairs of longitudinal and transverse opposing movable stops, each stop selectively actuated toward and away from the opposite stop, for orienting stacks on said table; an elevator for pallets below said table, said elevator comprising means for shifting a pallet thereon in a plurality of directions in substantial parallelism with said table, and said elevator further comprising a platform for pallets and means for turning said platform at least through 90 degrees about an axis which is normal to said table, said shifting means including means for shifting a pallet on said platform with reference to said axis and means for holding the pallet in a selected position; means for moving said elevator between raised and lowered positions; and means for moving said chamber to and from said predetermined position at such intervals that the chamber is moved to said predetermined position preparatory to reception of one or more stacks from said transporting means and is moved from said predetermined position upon completed orientation of the stack or stacks thereon and while the elevator with a pallet thereon is maintained in said raised position so that the oriented stack or stacks descend onto the pallet.

21. The apparatus of claim 20, further comprising means for receiving loaded pallets from said platform in the lowered position of said elevator, said elevator comprising means for conveying an empty pallet onto said platform and for conveying a loaded pallet from said platform onto said receiving means.

22. The apparatus of claim 21, wherein said conveying means comprises at least one chain conveyor.

* * * * *